(12) United States Patent
Kinnear et al.

(10) Patent No.: US 10,191,753 B2
(45) Date of Patent: Jan. 29, 2019

(54) GENERATING VERIFICATION METADATA AND VERIFYING A RUNTIME TYPE BASED ON VERIFICATION METADATA

(71) Applicant: Oracle International Corporation, Redwood Shores, CA (US)

(72) Inventors: Karen Margaret Pearson Kinnear, Boxborough, MA (US); Harold David Seigel, Acton, MA (US); Lois Dickinson Foltan, Nashua, NH (US); Ioi Kim Lam, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 326 days.

(21) Appl. No.: 15/156,975

(22) Filed: May 17, 2016

(65) Prior Publication Data

US 2017/0286255 A1 Oct. 5, 2017

Related U.S. Application Data

(60) Provisional application No. 62/315,219, filed on Mar. 30, 2016.

(51) Int. Cl.
*G06F 9/44* (2018.01)
*G06F 9/455* (2018.01)
*G06F 8/41* (2018.01)
*G06F 9/445* (2018.01)

(52) U.S. Cl.
CPC .......... *G06F 9/45504* (2013.01); *G06F 8/437* (2013.01); *G06F 9/44521* (2013.01)

(58) Field of Classification Search
None
See application file for complete search history.

(56) References Cited

U.S. PATENT DOCUMENTS

| 7,406,687 | B1 | 7/2008 | Daynes et al. |
| 7,644,402 | B1* | 1/2010 | Daynes ................ G06F 9/445 717/162 |
| 8,250,559 | B2 | 8/2012 | Daynes et al. |
| 2004/0237064 | A1 | 11/2004 | Liu et al. |

(Continued)

OTHER PUBLICATIONS

Reinhold, "The state of the module system", Accessed at http://openjdk.java.net/projects/jigsaw/spec/sotms/, Mar. 8, 2016, 27 pages.

(Continued)

*Primary Examiner* — Qamrun Nahar
(74) *Attorney, Agent, or Firm* — Invoke

(57) ABSTRACT

Operations include (a) receiving a request to verify a first runtime type loaded based on a first runtime type reference; (b) identifying verification metadata comprising a stored assignable relationship between a second runtime type reference and a third runtime type reference; (c) determining whether an actual assignable relationship between a second runtime type and a third runtime type adheres to the stored assignable relationship between the second runtime type reference and the third runtime type reference; and (d) responsive at least to determining that the actual assignable relationship adheres to the stored assignable relationship, determining that the first runtime type is verified based on the verification metadata.

20 Claims, 11 Drawing Sheets

(56) References Cited

U.S. PATENT DOCUMENTS

| | | | |
|---|---|---|---|
| 2009/0319554 A1* | 12/2009 | Krishnaswamy | ....... G06F 9/449 |
| 2017/0039043 A1 | 2/2017 | Haupt et al. | |
| 2017/0068520 A1 | 3/2017 | Buckley et al. | |

OTHER PUBLICATIONS

Reinhold, "JEP 220: Modular run-time images", OpenJDK, Accessed at http://openjdk.java.net/jeps/220, Oct. 23, 2014, 9 pages.

Oracle, "Project Jigsaw", Accessed at http://openjdk.java.net/projects/jigsaw/, Mar. 24, 2016.

Oracle, "Java(Trademark) Platform, Standard Edition 9, API Specification", Accessed at http://cr.openjdk.java.net/~mr/jigsaw/spec/api/, 2015, 10 pages.

Oracle, "Class Data Sharing", Accessed at https://docs.oracle.com/javase/1.5.0/docs/guide/vm/class-data-sharing.html, 2015, 2 pages.

IBM Knowledge Center "Class Data Sharing", IBM(Registered) SDK, Java (Trademark) Technology Edition, Version 7, Acccessed at https://www.ibm.com/support/knowledgecenter/SSYKE2_7.0.0/com.ibm.java.lnx.70.doc/diag/understanding/shared_classes.html, 2016.

Bateman et al., "JEP 261: Module System", Accessed at http://openjdk.java.net/jeps/261, Oct. 23, 2014, 14 pages.

* cited by examiner

GENERATING VERIFICATION METADATA AND VERIFYING A RUNTIME TYPE BASED ON VERIFICATION METADATA

BENEFIT CLAIM; RELATED APPLICATIONS; INCORPORATION BY REFERENCE

This application claims the benefit of U.S. Provisional Patent Application 62/315,219, filed Mar. 30, 2016, which is hereby incorporated by reference in its entirety.

This application is related to U.S. patent application Ser. No. 13/436,476, filed Mar. 30, 2012, and U.S. patent application Ser. No. 15/085,637, filed Mar. 30, 2016, each of which is hereby incorporated by reference in its entirety.

TECHNICAL FIELD

The present disclosure relates to verifying a runtime type. In particular, the present disclosure relates to verifying a runtime type based on previously-determined verification metadata.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
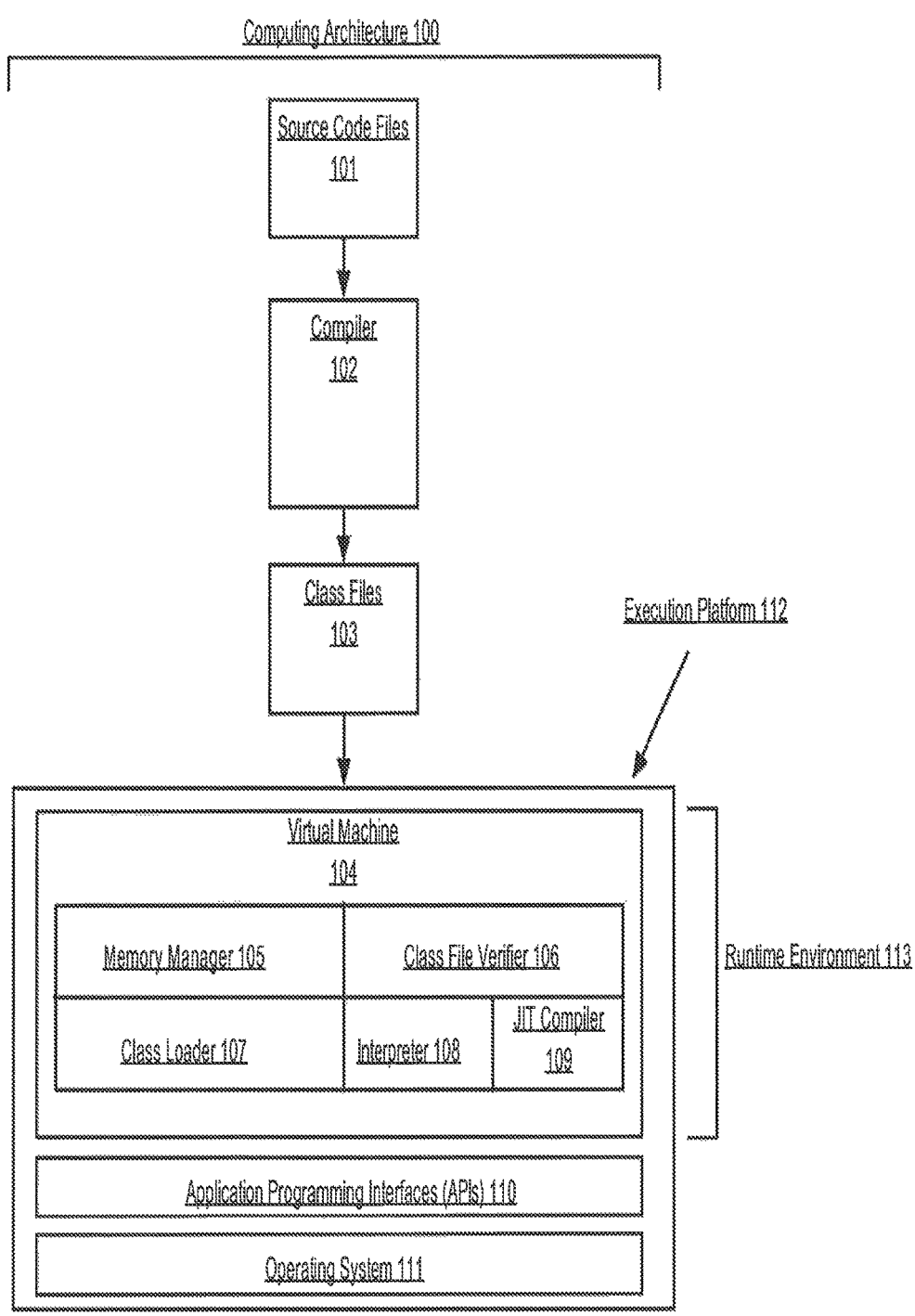
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. CLASS LOADERS
4. ARCHIVE
5. VERIFICATION METADATA
6. INITIAL VERIFICATION: GENERATING AND STORING VERIFICATION METADATA
7. RUNTIME VERIFICATION: USING VERIFICATION METADATA
8. MISCELLANEOUS; EXTENSIONS
9. HARDWARE OVERVIEW

1. General Overview

One or more embodiments include generating verification metadata during an initial verification. A class loader loads a particular runtime type that is to be verified during the initial verification. The particular runtime type is loaded based on a runtime type reference. The particular runtime type to be verified during the initial verification is referred to herein as Runtime Type 1' to distinguish from other runtime types described herein. The runtime type reference that is used for loading Runtime Type 1' is referred to herein as Runtime Type Reference 1. Runtime Type 1' includes a reference to a particular pair of runtime type references, Runtime Type Reference 2 and Runtime Type Reference 3.

The class loader examines Runtime Type 1' to verify whether Runtime Type 1' satisfies one or more static and/or structural constraints. One such constraint requires that Runtime Type 2' is assignable to Runtime Type 3'. Runtime Type 2' and Runtime Type 3' are loaded to determine whether Runtime Type 2' is assignable to Runtime Type 3'. If there is an assignable relationship, then the assignable relationship is stored.

Each required pre-loaded type associated with Runtime Type 1' is also loaded and verified. Verification of each pre-loaded type includes verifying that there is an assignable relationship between particular pairs of runtime type references. The assignable relationships are stored.

If Runtime Type 1' and each pre-loaded type satisfy each static and/or structural constraint, then Runtime Type 1' is verified during the initial verification.

The class loader generates verification metadata, including verification constraints. The verification metadata indicates that Runtime Type 1' has been verified. If the verification constraints are satisfied during a subsequent verification performed at a later runtime, then Runtime Type 1" (loaded based on Runtime Type Reference 1 during the subsequent verification) is considered verified, without examining Runtime Type 1" to determine whether Runtime Type 1" satisfies each static and/or structural constraint.

One verification constraint generated by the class loader requires that the actual assignable relationships, determined during the subsequent verification, adhere to the stored assignable relationships. As an example, a verification constraint requires that Runtime Type 2" (loaded based on Runtime Type Reference 2 during the subsequent verification) be assignable to Runtime Type 3" (loaded based on Runtime Type Reference 3 during the subsequent verification).

One or more embodiments include verifying a runtime type based on verification metadata during a subsequent verification at a later runtime (subsequent to the initial verification). A class loader receives a request to verify Runtime Type 1" loaded based on Runtime Type Reference 1. The class loader determines whether Runtime Type 1" satisfies the verification constraints. One such verification constraint requires that the actual assignable relationship between Runtime Type 2" and Runtime Type 3" adhere to the stored assignable relationship between Runtime Type Reference 2 and Runtime Type Reference 3. The stored assignable relationship indicates that Runtime Type Reference 2 is assignable to Runtime Type Reference 3. If Runtime Type 2" is assignable to Runtime Type 3", then this verification constraint is satisfied. If all verification constraints are satisfied, then the Runtime Type 1" is considered verified based on the verification metadata generated during the initial verification of Runtime Type 1'.

In one or more embodiments, verification metadata may include one or more of the following: a stored assignable relationship, an identification of a runtime type that has been verified in an initial verification, a checksum of a class file corresponding to the runtime type that has been verified in the initial verification, a size of the class file, a timestamp associated with the class file, a location identifier (such as a Uniform Resource Locator (URL)) of the class file, a class loader type reference for the runtime type that has been verified in the initial verification, a namespace or class path associated with the class loader type reference, a size of the contents of the namespace or class path, a timestamp associated with the contents of the namespace or class path, and/or a set of pre-loaded runtime types.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, one or more class loaders 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the Java Virtual Machine (JVM), the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "type" defined in the source code files 101 (or dynamically generated by the compiler 102/virtual machine 104). Examples of "types" include a class and an interface. A class is a template for the properties and behaviors of objects associated with the class. The class includes fields and methods associated with the objects of the class. An interface includes abstract methods that may be implemented by a class. A class that implements an interface inherits the abstract methods of the interface and provides a body to each abstract method. However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of types that provide related functionality. For example, a library may contain one or more class files that implement input/output (I/O) operations, mathematics tools, cryptographic techniques, graphics utilities, and so forth. Further, some types (or fields/methods within those types) may include access restrictions that limit their use to within a particular class/library/package or to classes with appropriate permissions.

2.1 Example Class File Structure

Figure 2:
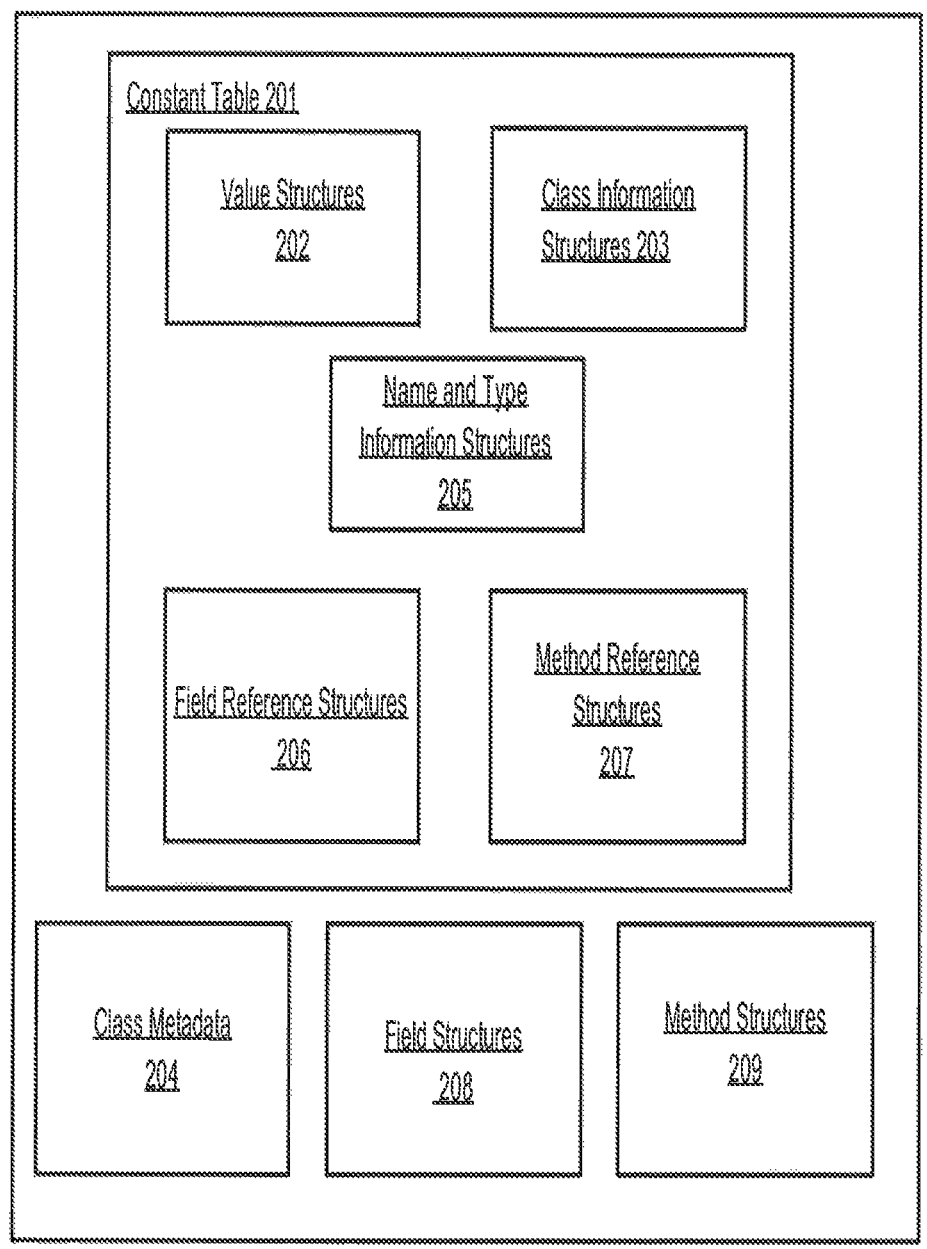
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class (or type) represented by the class file 200.

In FIG. 2, the class file 200 includes a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L CassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameter type(s) of the method and the return type of the method. For example, a method descriptor may follow the general form "({ParameterDescriptor}) ReturnDescriptor", where the {ParamelerDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
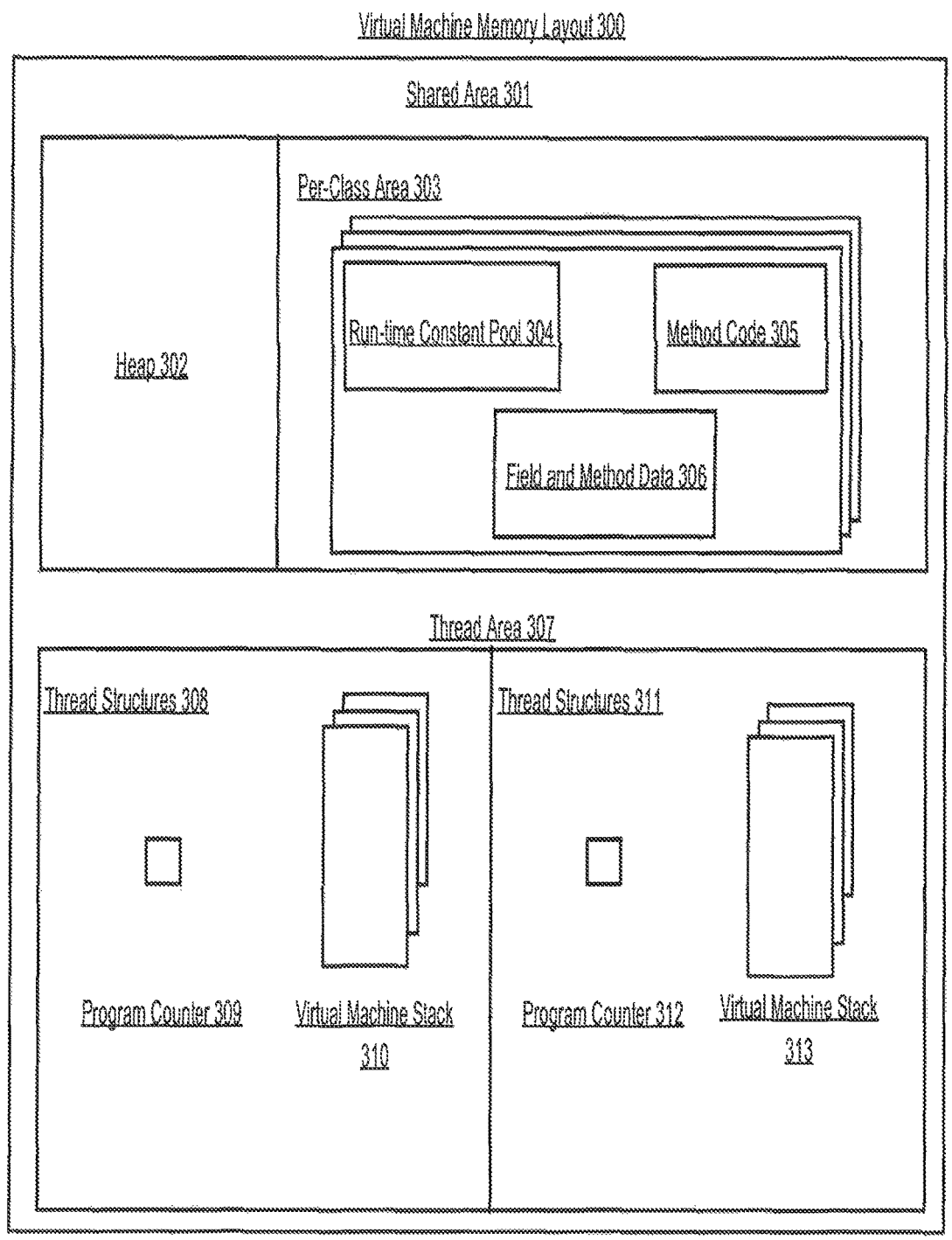
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
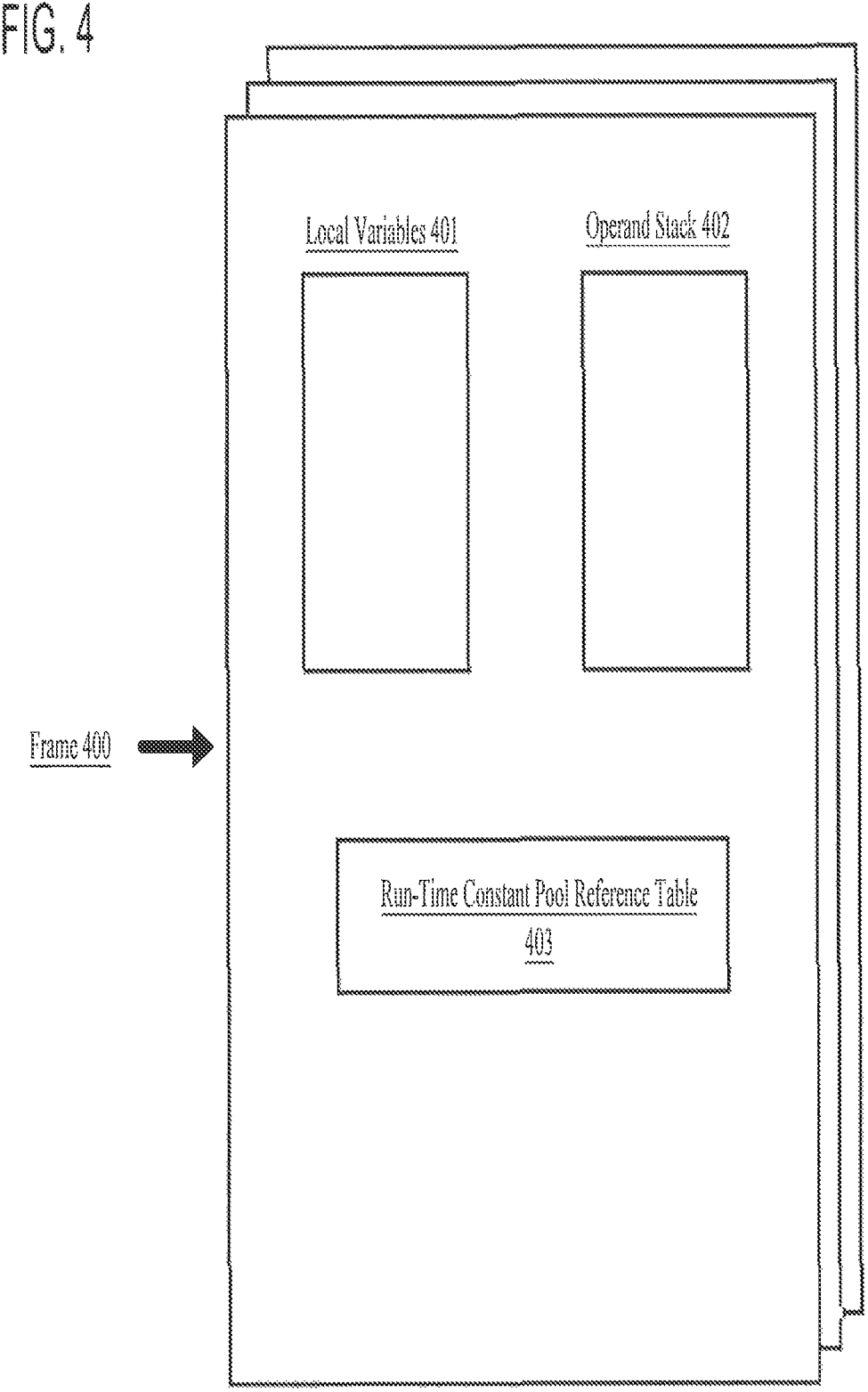
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes types such as classes and interfaces. Loading is the process of finding a class (or type) with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking a class loader 107 which loads an initial class. The technique by which the initial class is specified will vary from embodiment to embodiment. For example, one technique may have the virtual machine 104 accept a command line argument on startup that specifies the initial class.

To load a class (or an interface or another type), the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303. The loaded type is referred to herein as a "runtime type."

In some embodiments, when the class loader 107 loads a class, the class loader 107 also recursively loads the super-classes of the loaded class. The class loader 107 may also recursively load the required pre-loaded classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class conforms to one or more static constraints and/or structural constraints. Static constraints are those defining the well-formedness of the class file. Structural constraints specify constraints on relationships between instructions of one or more class file. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory addresses from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Class Loaders

Figure 5:
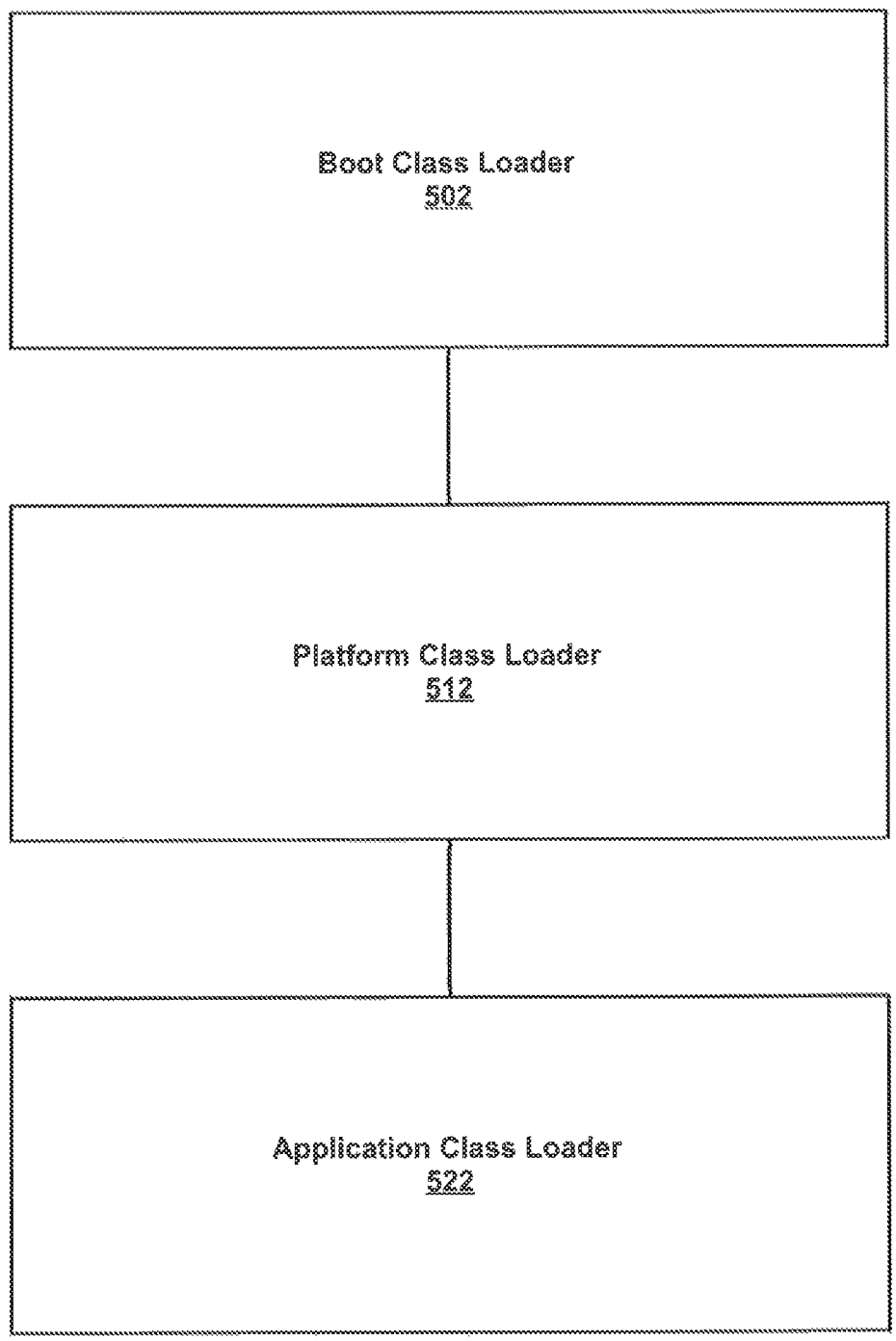
FIG. 5 illustrates examples of class loaders in block diagram form according to an embodiment.

Class loading, linking, and initializing are described above in Section 2.3, titled "Loading, Linking, and Initializing." FIG. 5 illustrates examples of class loaders in block diagram form according to an embodiment. A runtime environment 113 may have one or more class loaders. Examples of class loaders include boot class loader 502, platform class loader 512 (also referred to as an "extension class loader"), and application class loader 522. Additional or alternative class loaders may be used.

A "class loader type reference" refers to a name or identifier of a class loader. "Boot class loader" is an example of a class loader type reference of boot class loader 502. "Platform class loader" is an example of a class loader type reference of platform class loader 512. "Application class loader" is an example of a class loader type reference of application class loader 522.

Class loaders 502, 512, 522 of a runtime environment 113 are associated with a class loader hierarchy. Each class loader, except for boot class loader 502, is associated with a parent class loader. As an example, boot class loader 502 may be a parent of platform class loader 512. Platform class loader 512 may be a parent of application class loader 522.

When a particular class loader receives a request to load a runtime type, the particular class loader may delegate to a parent class loader prior to attempting to load the runtime type itself. If the parent class loader is unsuccessful in loading the runtime type, then the particular class loader attempts to load the runtime type. The particular class loader is referred to as the "initiating class loader." The class loader that successfully loads the runtime type is referred to as the "defining class loader."

As illustrated in FIG. 5, boot class loader 502 and platform class loader 512 are referred to herein as being in a "class loader hierarchy" to which the application class loader 522 delegates.

Each class loader is associated with an observability boundary and a visibility boundary, as described below. The observability boundary and visibility boundary of a particular class loader may be referred to herein as a "context" of the particular class loader.

3.1 Observability Boundary of a Class Loader

In an embodiment, an observability boundary of a class loader is defined by the locations (such as URLs) that are searched by the class loader in order to load a runtime type. The locations may include (a) locations included in a namespace, (b) locations included in a module path, and (c) a location of a runtime image. Different namespaces and/or module paths are associated with different class loaders. If a particular type is not found within an observability boundary associated with a particular class loader, then the particular class loader cannot load the particular type.

A namespace (also referred to as a "class search path" or "class path") associated with a particular class loader includes an ordered set of entries that are searched, by the particular class loader, to load a runtime type from an unnamed module (or a set of non-modular code that does not include a module declaration). The search is conducted according to the sequence of the ordered set of entries. The first entry that is found to define the runtime type to be loaded is used to load the particular type.

An entry may be a URL (or other location identifier) associated with a class file or an artifact (such as, a JAR file or a module artifact). Alternatively, an entry may be a URL (or other location identifier) of a directory including a class file or an artifact. As an example, a URL of a JAR file in a namespace may be: . . . /java/embedded/users/joe_smith/tests/hw.jar.

A namespace is defined by a host system. In an embodiment, a namespace of boot class loader 502 comprises a boot append class path. A namespace of platform class loader 512 comprises a platform class path, which may be stored in a "/ext" directory or other directory(s). A namespace of application class loader 522 comprises an application class path defined using, for example, a -cp statement or a -classpath in a command line. Alternatively, a namespace of application class loader 522 is defined using, for example, a CLASSPATH environment variable of a development toolkit.

A module path associated with a particular class loader includes an ordered set of entries that are searched, by the particular class loader, to load a runtime type from a named module (such as a named explicit module or a named automatic module). The search is conducted according to the sequence of the ordered set of entries. The first entry that is found to define the runtime type to be loaded is used to load the particular type.

An entry may be a URL (or other location identifier) associated with a module artifact. Alternatively, an entry may be a URL (or other location identifier) of a directory including a module artifact.

A module path is defined by a host system. A module path may be defined in, for example, a -modulepath statement in a command line.

3.2 Visibility Boundary of a Class Loader

In an embodiment, a visibility boundary of a class loader is defined based on (a) a readability graph associated with a module system, and (b) a set of module-to-loader mappings associated with the class loader. A runtime module that is (a) in the readability graph and (b) associated with a particular class loader based on a module-to-loader mapping may be referred to herein as being "defined to" the particular class loader. A runtime type is within the visibility boundary of a particular class loader if the runtime type is declared in a package that is defined to a runtime module that is defined to the particular class loader. Further descriptions of a visibility boundary of a class loader in a module system is included in at least U.S. patent application Ser. No. 15/085,637, filed Mar. 30, 2016, which is incorporated by reference in its entirety.

4. Archive

As described above in Section 2.3, titled "Loading, Linking, and Initializing," a runtime type is a type that has been loaded into an internal memory of a particular virtual machine. The internal memory of the particular virtual machine is not directly shared with other virtual machines. Another virtual machine may not load the runtime type from the internal memory of the particular virtual machine.

In contrast, multiple virtual machines may load a runtime type based on an archived runtime type from an archive (also referred to herein as a "shared archive"). The archive is a re-mappable portion of memory that is shared amongst multiple virtual machines. When a particular virtual machine is initialized, the archive (including the archived runtime type) is memory-mapped and/or copied into the internal memory of the particular virtual machine. During class loading, a class loader of the particular virtual machine may pass the archived runtime type from the internal memory as a runtime type to the particular virtual machine. Passing the archived runtime type from the internal memory as a runtime type to the particular virtual machine may be referred to herein as "loading the runtime type from the archive" and/or "loading the runtime type based on the archived runtime type." The ability to allow multiple virtual machines to access an archive is also referred to as "Class Data Sharing." Further descriptions of class data sharing are included in at least U.S. patent application Ser. No. 13/436,476, filed Mar. 30, 2012, and U.S. patent application Ser. No. 15/085,637, filed Mar. 30, 2016, each of which is incorporated by reference in its entirety.

5. Verification Metadata

In one or more embodiments, verification metadata is information that is (1) generated, during an initial verification, based on determining whether static and/or structural constraints for one or more runtimes types are satisfied, and (2) applied, during a subsequent verification, to verify the runtime types without determining whether the static and/or structural constraints are satisfied.

Verification metadata may include one or more of the following: a stored assignable relationship, an identification of a runtime type that has been verified in an initial verification, a checksum of a class file corresponding to the runtime type that has been verified in the initial verification, a size of the class file, a timestamp associated with the class file, a location identifier (such as a Uniform Resource Locator (URL)) of the class file, a class loader type reference for the runtime type that has been verified in the initial verification, a namespace or class path associated with the class loader type reference, a size of the contents of the namespace or class path, a timestamp associated with the contents of the namespace or class path, and/or a set of pre-loaded runtime types.

Verification metadata, corresponding to a set of runtime types, may be stored in association with the set of runtime types. For example, verification metadata and the corresponding set of runtime types may be stored in a particular runtime image. The particular runtime image may include a stored runtime environment 113. As another example, verification metadata and the corresponding set of runtime types may be stored in a particular archive (which may be used in Class Data Sharing). As another example, verification metadata and the corresponding set of runtime types may be stored in a particular machine language image (which may have been generated by an ahead-of-time compiler).

6. Initial Verification: Generating and Storing Verification Metadata

Figure 6:
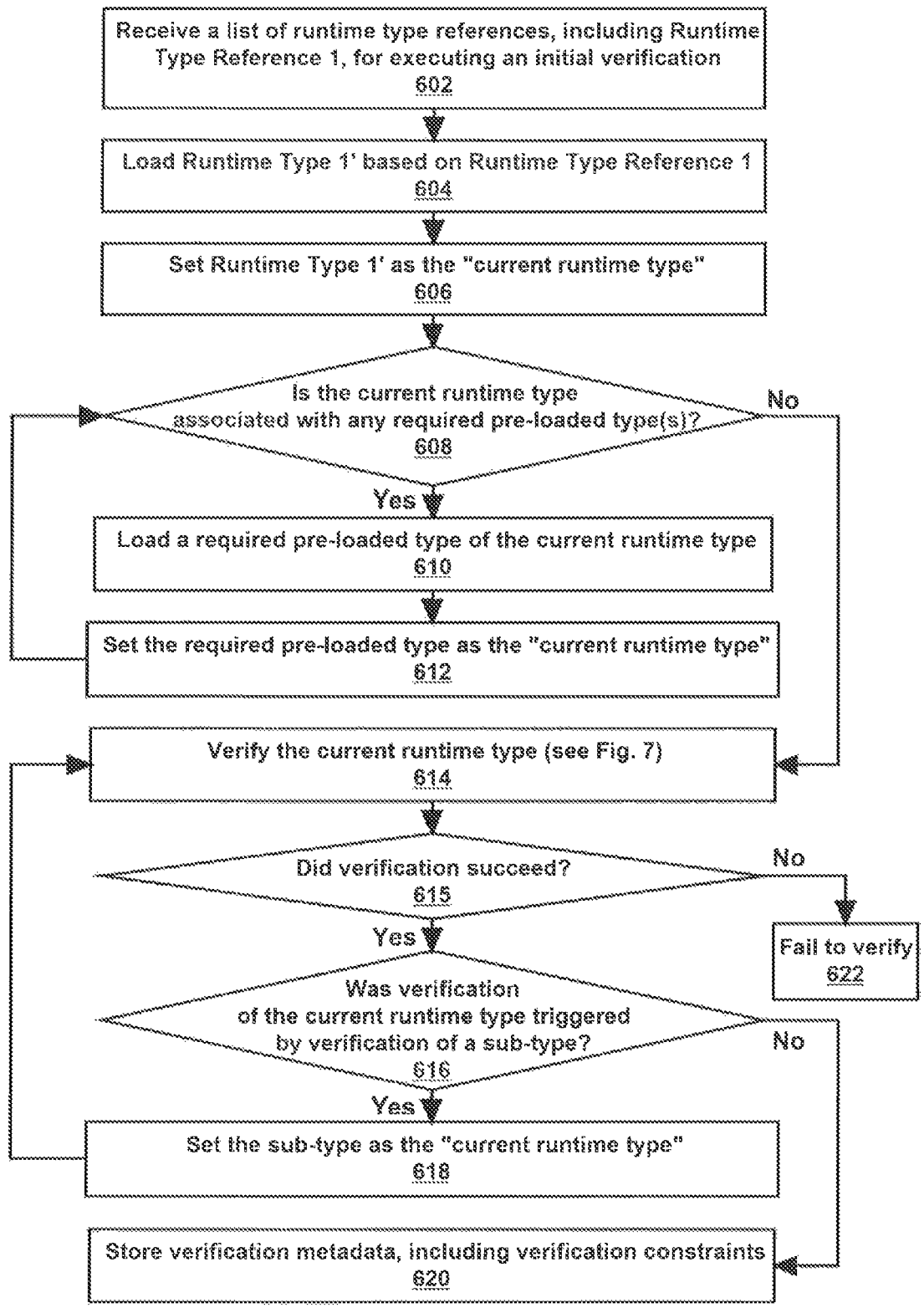
FIG. 6 illustrates an example set of operations for generating and storing verification metadata during an initial verification according to an embodiment.

FIG. 6 illustrates an example set of operations for generating and storing verification metadata during an initial verification according to an embodiment. The verification metadata may be generated and stored during generation of a particular runtime image. Alternatively, the verification metadata may be generated and stored during archive dumping, which involves loading a set of runtime types into an archive. The archive may be used in Class Data Sharing. Alternatively, the verification metadata may be generated and stored during generation of a particular machine language image. The particular machine language image may be generated by an ahead-of-time compiler. Alternatively, the verification metadata may be generated and stored during another process.

One or more embodiments include receiving a list of runtime type references, including a particular runtime type reference (referred to herein as "Runtime Type Reference 1" to distinguish from other runtime type references described herein), for executing an initial verification (Operation 602). The list of runtime type references may be received via a variety of mechanisms, including a command line, or a file. Additionally or alternatively, the list of runtime type references may be received dynamically by examining the contents of a particular runtime image.

Each runtime type reference comprises a [type, defining class loader type reference] pair. A defining class loader type reference identifies a class loader that directly loads a runtime type, as opposed to indirectly returning the runtime type through delegation to a parent class loader.

One or more embodiments include loading a particular runtime type (referred to herein as "Runtime Type 1'" to distinguish from other runtime types described herein). Runtime Type 1 is loaded based on Runtime Type Reference 1 (Operation 604). A runtime type is a type that has been loaded into an internal memory of a virtual machine. As an example, the runtime type may be loaded into a heap memory and/or a per-class storage area of a virtual machine. The runtime type is loaded based on a runtime type reference. The defining class loader specified in the runtime type reference loads the runtime type. The defining class loader loads the runtime type based on the type specified in the runtime type reference.

One or more embodiments include setting Runtime Type 1' as the "current runtime type" (Operation 606). Setting Runtime Type 1' as the current runtime type may simply include performing the operations below using Runtime Type 1' as the current runtime type. Setting may include configuring a current runtime type variable in a loop as Runtime Type 1'.

One or more embodiments include determining whether the current runtime type is associated with any required pre-loaded type(s) (such as, a super-type) (Operation 608). A required pre-loaded type may be referenced within the bytecode (or other representation of code) of the current runtime type. As an example, a current runtime type may be MountainBike. A super-type of MountainBike may be Bicycle. A definition of MountainBike may include the following statement: public class MountainBike extends Bicycle. The extends keyword may indicate that Bicycle is a super-type of MountainBike.

In an embodiment, a class has a single direct superclass class. In the absence of an explicit superclass, a class may implicitly have a superclass, which may be a particular base class (e.g., the Object class in Java).

One or more embodiments include loading a required pre-loaded type of the current runtime type (Operation 610). Loading is described above with reference to Operation 604.

One or more embodiments include setting the required pre-loaded type as the "current runtime type" (Operation 612). Operations 608 to 612 are reiterated until all required pre-loaded types are traversed.

If more than one required pre-loaded type is identified at Operation 608, then each of the required pre-loaded types is iteratively set as the "current runtime type." Operations 610 is reiterated to load each current runtime type. Operation 612 is reiterated to traverse through all required pre-loaded types of each current runtime type.

In an embodiment, classes can be derived from classes that are derived from classes that are derived from classes, and so on, and ultimately derived from the topmost class, Object. Such a class is said to be descended from all the classes in the inheritance chain stretching back to Object. Each class in the inheritance chain is traversed according to Operations 608 to 612.

One or more embodiments include verifying the current runtime type (Operation 614). Verifying the current runtime type involves examining the current runtime type to determine whether one or more static and/or structural constraints are satisfied. The class loader examines each bytecode, code, command, and/or instruction of the current runtime type. Examples of operations performed during the verification process are described below with reference to FIG. 6. Additional operations (not illustrated in the Figures) may also be performed.

One or more embodiments include determining whether the verification succeeded (Operation 615). If the verification is unsuccessful, then a failure is determined (Operation 622). In an embodiment, if the verification is unsuccessful, verification metadata is not stored.

If more than one required pre-loaded type is identified at Operation 608, then each of the required pre-loaded types is iteratively set as the "current runtime type." Operations 614 to 615 are reiterated to verify each current runtime type.

One or more embodiments include determining whether the verification of the current runtime type was triggered by verification of a sub-type (Operation 616). If the current runtime type was loaded as a result of Operation 610, then the verification of the current runtime type was triggered by verification of a sub-type. If the current runtime type was loaded based on a runtime type reference included in the list received at Operation 602, then the verification of the current runtime type was not triggered by verification of a sub-type.

One or more embodiments include setting the sub-type as the "current runtime type" (Operation 618). Setting the sub-type as the current runtime type may simply include performing the operations below using the sub-type as the current runtime type. Setting may include configuring a current runtime type variable in a loop as the sub-type. Operations 614 to 618 are reiterated until all relevant sub-types are traversed.

The following example illustrates a traversal through the operations where multiple required pre-loaded types are identified for a given runtime type. As an example, Runtime Type X may have two required pre-loaded types: Runtime Type Y and Runtime Type Z. Runtime Type Y may have two required pre-loaded types: Runtime Type A and Runtime Type B.

Initially, at Operation 606, Runtime Type X is set as the "current runtime type." At Operation 608, Runtime Type Y and Runtime Type Z are identified as required pre-loaded types. At Operation 610, one of the required pre-loaded types (for example, Runtime Type Y) is loaded. At Operation 612, Runtime Type Y is set as the "current runtime type." At Operation 608, Runtime Type A and Runtime Type B are identified as required pre-loaded types. At Operation 610, one of the required pre-loaded types (for example, Runtime Type A) is loaded. At Operation 612, Runtime Type A is set as the "current runtime type." At Operation 608, no required pre-loaded types are identified.

Continuing the example, at Operation 614, Runtime Type A is verified. Since more than one required pre-loaded type was identified at Operation 608 when Runtime Type Y was the "current runtime type," Operations 614-615 are reiterated. Operations 614-615 are reiterated with respect to Runtime Type B. After verification of Runtime Type B is performed, all required pre-loaded types identified at Operation 608 when Runtime Type Y was the "current runtime type" are traversed.

Continuing the example, since all required pre-loaded types identified at Operation 608 when Runtime Type Y was the "current runtime type" have been traversed, Operation 616 is next performed. At Operation 616, it is determined whether verification of Runtime Type A (and/or Runtime Type B) was triggered by verification of a sub-type. Since the verification of Runtime Type A (and/or Runtime Type B) was triggered by verification of Runtime Type Y, the answer is "Yes." Then Runtime Type Y is set as the "current runtime type."

Continuing the example, at Operation 614, Runtime Type Y is verified. Since more than one required pre-loaded type was identified at Operation 608 when Runtime Type X was the "current runtime type," Operations 614-615 are reiterated. Operations 614-615 are reiterated with respect to Runtime Type Z. After verification of Runtime Type Z is performed, all required pre-loaded types identified at Operation 608 when Runtime Type X was the "current runtime type" are traversed.

Continuing the example, since all required pre-loaded types identified at Operation 608 when Runtime Type X was the "current runtime type" have been traversed, Operation 616 is next performed. At Operation 616, it is determined whether verification of Runtime Type Y (or Runtime Type Z) was triggered by verification of a sub-type. Since the verification of Runtime Type Y (and/or Runtime Type Z) was triggered by verification of Runtime Type A, the answer is "Yes." Then Runtime Type X is set as the "current runtime type."

Continuing the example, at Operation 614, Runtime Type X is verified. At Operation 616, it is determined that verification of Runtime Type X was not triggered by verification of a sub-type. Then, Operation 620 is performed, as described below.

One or more embodiments include storing verification metadata, including verification constraints (Operation 620). The verification metadata includes verification information associated with Runtime Type Reference 1 as well as additional runtime type references included in the list received at Operation 602. The verification metadata also includes verification information associated with each pre-loaded type for Runtime Type Reference 1 and the runtime type references included in the list received at Operation 602.

The verification information associated with Runtime Type Reference 1 includes identification of Runtime Type Reference 1 as a runtime type that has been verified during initial verification. The identification of Runtime Type Reference 1 includes (1) Type 1, and (2) the defining class loader type reference. The verification information also includes assignable relationship(s) required by Runtime Type Reference 1. Stored assignable relationship(s) are described below with reference to Operation 710.

The verification information may also include additional information. As an example, a checksum of a class file corresponding to Runtime Type Reference 1, a size of the class file, a timestamp associated with the class file, and/or a location identifier (such as a Uniform Resource Locator (URL)) of the class file may be identified. Additionally or alternatively, a namespace or class path associated with the defining class loader type reference, a size of the contents of the namespace or class path, and/or a timestamp associated with the contents of the namespace or class path may be identified. The identified pieces of information may be stored as part of the verification information.

Figure 7:
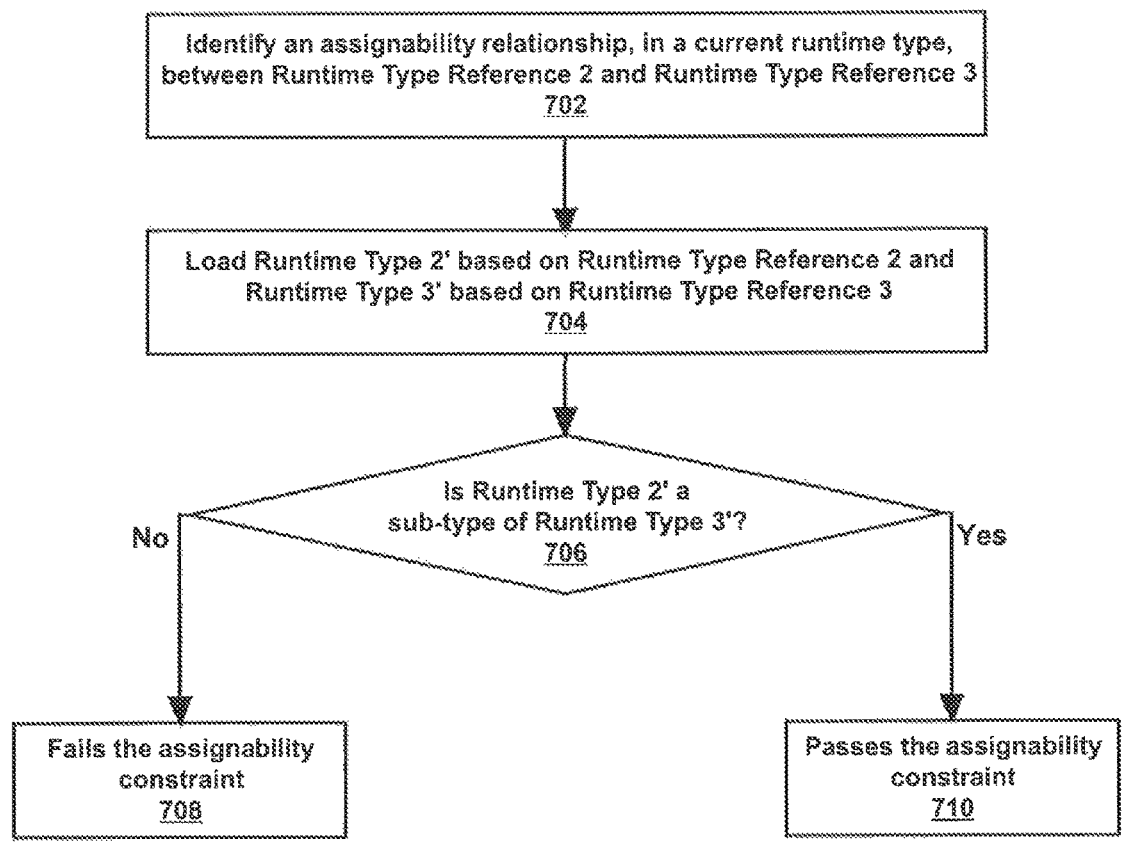
FIG. 7 illustrates an example set of operations for verifying an assignable relationship between two runtime type references during an initial verification according to an embodiment.

FIG. 7 illustrates an example set of operations for verifying an assignable relationship between two runtime type references during an initial verification according to an embodiment.

One or more embodiments include identifying an assignability relationship, in a current runtime type, between two runtime type references (referred to herein as Runtime Type Reference 2 and Runtime Type Reference 3 to distinguish from other runtime type references referred to herein) (Operation 702). The assignability relationship is identified based on the bytecodes (or other representation of code) of the current runtime type. As an example, in the bytecodes of the current runtime type, there may be an assignment statement involving Type 2 and Type 3. The assignment statement may assign an object of Type 2 to an object of Type 3. Defining class loaders for Type 2 and Type 3 may be identified, respectively. Based on the assignment statement, an assignability relationship between Runtime Type Reference 2 and Runtime Type Reference 3 is identified.

As another example, a particular method may accept a parameter of Type 3. In the bytecodes of the current runtime type, a call to the method may input a parameter of Type 2. Defining class loaders for Type 2 and Type 3 may be identified, respectively. Based on the call to the method, an assignability relationship between Runtime Type Reference 2 and Runtime Type Reference 3 is identified.

One or more embodiments include loading Runtime Type 2' based on Runtime Type Reference 2 and Runtime Type 3' based on Runtime Type Reference 3 (Operation 704). Loading is described above with reference to Operation 604.

One or more embodiments include determining whether Runtime Type 2' is a sub-type of Runtime Type 3' (Operation 706). An inheritance chain corresponding to Runtime Type 2' is identified recursively. A super-type of Runtime Type 2' is identified, a super-type of the super-type of Runtime Type 2' is identified, and so on. If Runtime Type 3' is within an inheritance chain of Runtime Type 2', then Runtime Type 2' is a sub-type of Runtime Type 3'.

If Runtime Type 2' is not a sub-type of Runtime Type 3', then the assignability constraint for the assignability relationship between Runtime Type Reference 2 and Runtime Type Reference 3 is not satisfied (Operation 708). Since the assignability constraint is not satisfied, the current runtime type is not successfully verified. Verification metadata regarding the current runtime type is not stored. Alternatively, verification metadata indicating that the current runtime type is not verified is stored. A subsequent verification of the current runtime type would not be able to rely on the verification metadata generated during the initial verification of the current runtime type. At a subsequent verification, the current runtime type may be verified by determining whether static and/or structural constraints are satisfied.

If Runtime Type 2' is a sub-type of Runtime Type 3', then the assignability constraint for the assignability relationship between Runtime Type Reference 2 and Runtime Type Reference 3 is satisfied (Operation 710). An assignable relationship between Runtime Type Reference 2 and Runtime Type Reference 3 is stored as part of the verification metadata corresponding to the current runtime type. The stored assignable relationship indicates that Runtime Type Reference 2 must be a sub-type of Runtime Type Reference 3.

7. Subsequent Verification: Using Verification Metadata

Figure 8A:
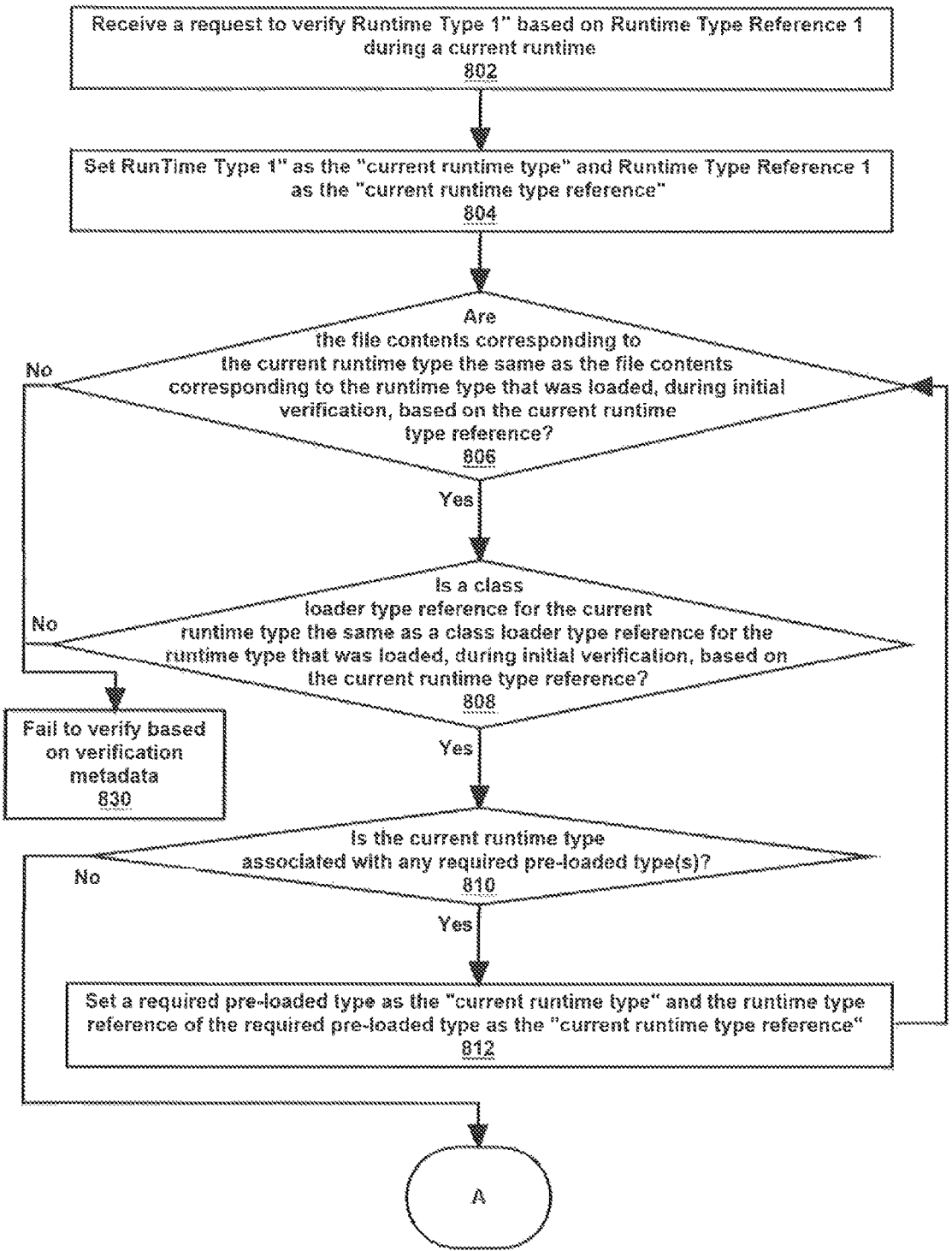
FIGS. 8A-8B illustrates an example set of operations for verifying a runtime type based on verification metadata during a current runtime according to an embodiment.
Figure 8B:
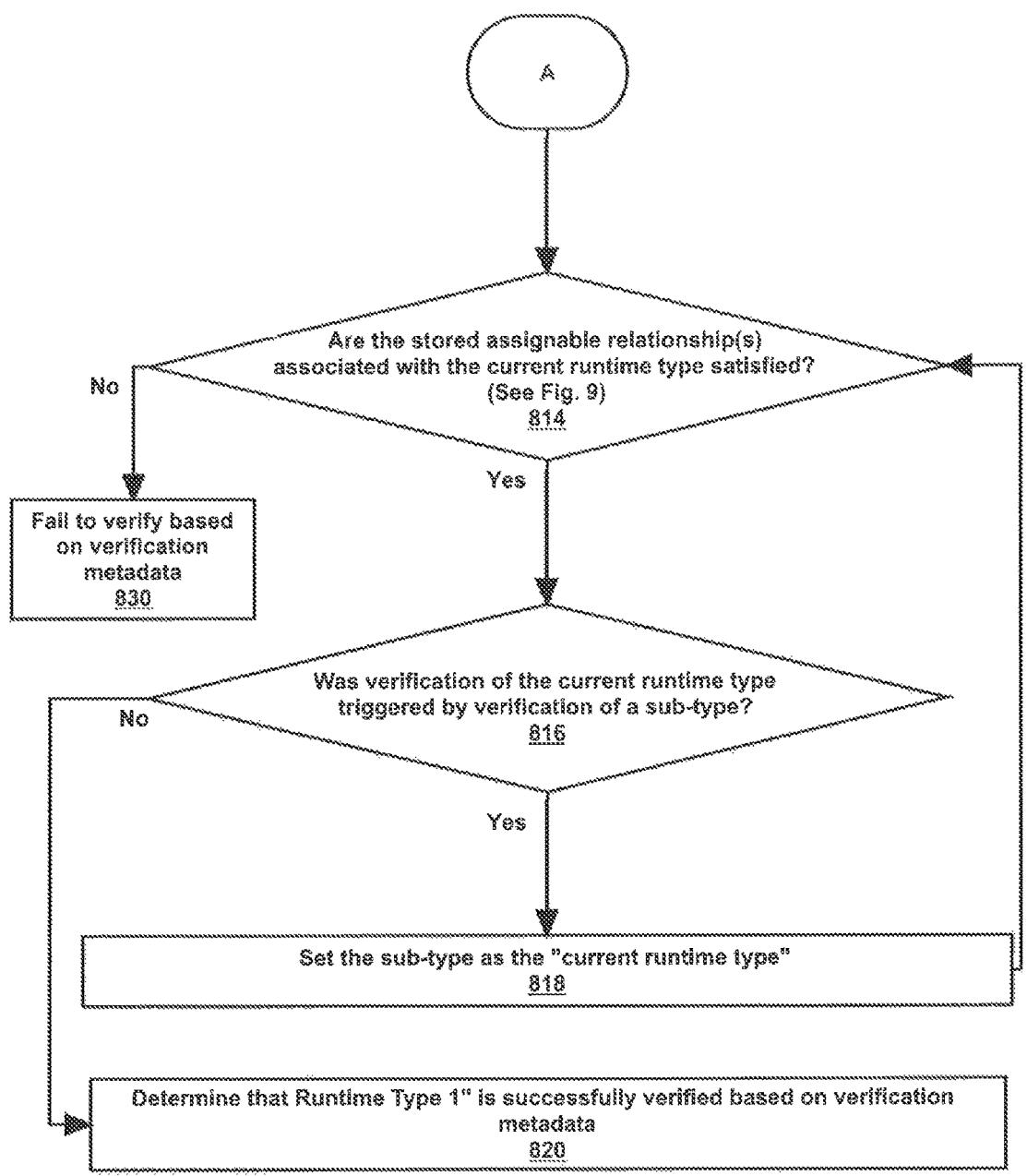

FIGS. 8A-8B illustrates an example set of operations for verifying a runtime type based on verification metadata during a subsequent verification according to an embodiment. The verification metadata includes verification information associated with one or more runtime types loaded during an initial verification performed at a prior runtime. The operations for verifying a runtime type based on verification metadata may be performed in multiple different runtimes.

The verification metadata may be used during a subsequent verification in order to verify a set of runtime types loaded from a particular runtime image. Alternatively, the verification metadata may be used during a subsequent verification in order to verify a set of runtime types loaded from an archive. Alternatively, the verification metadata may be used during a subsequent verification in order to verify a set of runtime types loaded from a particular machine language image. Alternatively, the verification metadata may be used to verify one or more runtime types in another process.

One or more embodiments include receiving a request to verify Runtime Type 1" based on Runtime Type Reference 1 during a subsequent verification (Operation 802). The request to verify Runtime Type 1" may be triggered by a reference to Runtime Type Reference 1 in a bytecode (or other representation of code) that is being executed.

One or more embodiments include setting Runtime Type 1" as the "current runtime type" and Runtime Type Reference 1 as the "current runtime type reference" (Operation 804).

One or more embodiments include determining whether the file contents corresponding to the current runtime type are the same as the file contents corresponding to the runtime type that was loaded, during initial verification, based on the current runtime type reference (Operation 806).

The current runtime type reference is a stored runtime type reference included in the verification metadata for verifying the current runtime type. The verification metadata indicates that a runtime type (such as Run Time Type 1) loaded from the stored runtime type reference (such as Runtime Type Reference 1) was previously verified during an initial verification. At Operation 806, a comparison is made between two runtime types, each (a) loaded from the same runtime type reference (that is, the current runtime type reference, or the stored runtime type reference), but (b) loaded in different contexts (that is, the initial verification and the subsequent verification, respectively).

Whether the file contents are the same may be determined based on various types of information. As an example, the verification metadata may include a checksum of the class file corresponding to Runtime Type Reference 1 in the runtime environment during the initial verification. A checksum of the class file corresponding to Runtime Type Reference 1 in the runtime environment during the subsequent verification may be determined. If the two checksums match, then the file contents may be determined to be the same. Additionally or alternatively, a comparison between the sizes of the class files, the timestamps associated with the class files, and/or the location identifiers of the class files may be performed.

As another example, the verification metadata may include a namespace or class path associated with the defining class loader type reference of Runtime Type Reference 1 in the runtime environment during the initial verification. A namespace or class path associated with the defining class loader reference of Runtime Type Reference 1 in the runtime environment during the subsequent verification may be determined. If the two namespaces or class paths match, either for relevant parts or in total, then the file contents are determined to be the same. The two namespaces or class paths match if the entries in the two namespaces or class paths are (1) the same and (2) in the same sequence. Additionally or alternatively, if the contents of the two namespaces or class paths match, either for relevant parts or in total, then the file contents are determined to be the same. The contents of the two namespaces or class paths match if the contents of each entry in one namespace or class path is the same as the contents of the corresponding entry in the other namespace or class path. Whether the contents of the two namespaces or class paths match may be determined by, for example, performing a comparison between the sizes of the contents of the namespaces, and/or the timestamps associated with the contents of the namespaces may be performed.

If the file corresponding to the current runtime type is not the same as the file corresponding to the runtime type that was loaded, during initial verification, based on the current runtime type reference, then Runtime Type 1" is not verified based on the verification metadata (Operation 830). A class loader may perform full verification of Runtime Type 1". The class loader may examine each bytecode, code, command and/or instruction of Runtime Type 1" to determine whether each static and/or structural constraint is satisfied.

One or more embodiments include determining whether a class loader type reference for the current runtime type is the same as a class loader type reference for the runtime type that was loaded, during initial verification, based on the current runtime type reference (Operation 808). The defining class loader type reference identified in the current runtime type reference (that is, the stored runtime type reference included in the verification metadata) is identified as the defining class loader type reference for the runtime type that was loaded during initial verification. The defining class loader type reference of the class loader that loaded the current runtime type is identified as the defining class loader type reference for the current runtime type. The two defining class loader type references are compared to determine whether there is a match.

If the class loader type reference for the current runtime type is not the same as the class loader type reference for the runtime type that was loaded, during initial verification, based on the current runtime type reference, then Runtime Type 1" is not verified based on the verification metadata (Operation 830). As described above, a class loader may perform full verification of Runtime Type 1".

If (a) the file contents corresponding to the current runtime type are the same as the file contents corresponding to the runtime type that was loaded, during initial verification, based on the current runtime type reference and (b) a class loader type reference for the current runtime type is the same as a class loader type reference for the runtime type that was loaded, during initial verification, based on the current runtime type reference (that is, the answers to both Operations 806 and 808 are "Yes"), then the current runtime type is referred to herein as being "equivalent to" the runtime type that was loaded, during initial verification, based on the current runtime type reference.

One or more embodiments include determining whether the current runtime type is associated with any required pre-loaded type(s) (such as, a super-type) (Operation 810). Identification of a required pre-loaded type is described above with reference to Operation 608.

One or more embodiments include setting a required pre-loaded type as the "current runtime type" and the runtime type reference of the required pre-loaded type as the "current runtime type reference" (Operation 812). Operations 806 to 812 are reiterated until all required pre-loaded types are traversed.

If more than one required pre-loaded type is identified at Operation 810, then each of the required pre-loaded types is iteratively set as the "current runtime type." Operations 806 to 808 are reiterated to determine whether there is equivalence between (a) each current runtime type and (b) the runtime type that was loaded, during initial verification, based on the current runtime type reference of each current runtime type. Operation 810 is reiterated to traverse through all required pre-loaded types of each current runtime type.

One or more embodiments include determining whether stored assignable relationship(s) associated with the current runtime type are satisfied (Operation 814). Examples of operations for determining whether a particular stored assignable relationship is satisfied are described below with reference to FIG. 9. The operations may be repeated for determining whether each stored assignable relationship associated with the current runtime type is satisfied.

If any of the stored assignable relationship(s) are not satisfied, then Runtime Type 1" is not verified based on the verification metadata (Operation 830). As described above, a class loader may perform full verification of Runtime Type 1".

If more than one required pre-loaded type is identified at Operation 810, then each of the required pre-loaded types is iteratively set as the "current runtime type." Operation 814 is reiterated to determine whether the actual assignable relationships associated with each current runtime type adhere to the stored assignable relationships associated with each current runtime type.

One or more embodiments include determining whether verification of the current runtime type was triggered by verification of a sub-type (Operation 816). If the current runtime type was verified based on identification of the current runtime type at Operation 812, then the verification of the current runtime type was triggered by verification of a sub-type. If the current runtime type was verified based on identification of the current runtime type at Operation 802, then the verification of the current runtime type was not triggered by verification of a sub-type.

One or more embodiments include setting the sub-type as the "current runtime type" (Operation 818). Operations 814 to 818 are reiterated until all relevant sub-types are traversed.

One or more embodiments include determining that Runtime Type 1" is successfully verified based on previously-determined verification metadata (Operation 820). The initial verification of Runtime Type 1'(loaded based on Runtime Type Reference 1) is validated. Runtime Type 1" is recorded as being verified based on verification metadata. Runtime Type 1" is thus verified without examining whether Runtime Type 1" satisfies each static and/or structural constraint.

In an embodiment, the verification metadata may include verification information associated with Runtime Type Reference 1 as well as other runtime type references which were recorded due to runtime types verified during the initial verification. Even if the verification metadata corresponding to Runtime Type 1" is not validated during a subsequent verification at a particular runtime, the verification metadata corresponding to other runtime types may still be used during the particular runtime. The verification metadata corresponding to each runtime type may be used during a particular runtime if the verification constraints of that runtime type are satisfied during the particular runtime.

Figure 9:
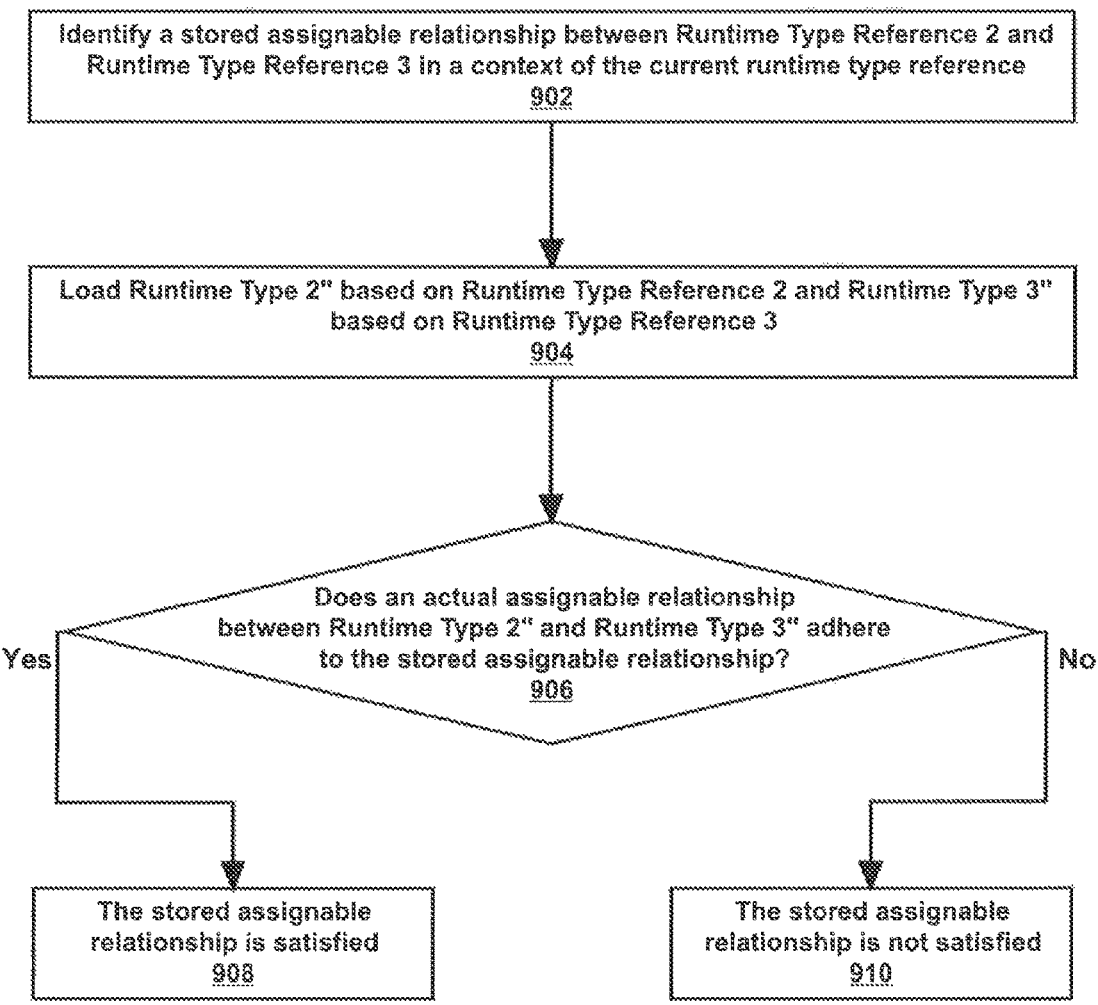
FIG. 9 illustrates an example set of operations for verifying that a stored assignable relationship is satisfied during a current runtime according to an embodiment.

FIG. 9 illustrates an example set of operations for verifying that a stored assignable relationship is satisfied during a current runtime according to an embodiment.

One or more embodiments include identifying a stored assignable relationship between Runtime Type Reference 2 and Runtime Type Reference 3 in a context of the current runtime type reference (Operation 902). The stored assignable relationship is identified from the verification metadata corresponding to the current runtime type reference. The verification metadata includes information indicating that Runtime Type Reference 2 is a sub-type of Runtime Type Reference 3 in the context of the current runtime type reference. The information indicates that Runtime Type 2' (loaded based on Runtime Type Reference 2 during initial verification) was a sub-type of Runtime Type 3' (loaded based on Runtime Type Reference 3 during initial verification), wherein Runtime Type 2' and Runtime Type 3' were loaded based on a context in which the initiating class loader of Runtime Type 2' and Runtime Type 3' was the defining class loader for the runtime type loaded based on the current runtime type reference during initial verification.

One or more embodiments include loading Runtime Type 2" based on Runtime Type Reference 2 and Runtime Type 3" based on Runtime Type Reference 3 (Operation 904). Loading is described above with reference to Operation 604.

One or more embodiments include determining whether an actual assignable relationship between Runtime Type 2" and Runtime Type 3" adheres to the stored assignable relationship (Operation 906). Determining an assignable relationship between runtime types is described above with reference to Operation 706. The assignable relationship between Runtime Type 2" and Runtime Type 3" is referred to herein as the actual assignable relationship in the runtime environment during the subsequent verification.

The actual assignable relationship is compared to the stored assignable relationship. If the actual assignable relationship indicates that Runtime Type 2" is a sub-type of Runtime Type 3", and the stored assignable relationship indicates that Runtime Type Reference 2 is a sub-type of Runtime Type Reference 3, then the actual assignable relationship adheres to the stored assignable relationship. The relationship between Runtime Type 2" and Runtime Type 3" and the relationship between Runtime Type Reference 2 and Runtime Type Reference 3 need not be exactly the same. There may be a certain number of intermediate sub-types in the inheritance chain between Runtime Type 2" and Runtime Type 3". Meanwhile, there may be a different number of intermediate sub-types in the inheritance chain between Runtime Type Reference 2 and Runtime Type Reference 3.

If the actual assignable relationship between Runtime Type 2" and Runtime Type 3" adheres to the stored assignable relationship, then the stored assignable relationship is satisfied (Operation 908). The current runtime type may be verified based on the verification metadata, as described above with reference to FIGS. 8A-8B. The current runtime type may be verified based on the verification metadata regardless of whether Runtime Type 2" is equivalent to Runtime Type 2' (loaded based on Runtime Type Reference 2 during the initial verification). The current runtime type may be verified based on the verification metadata without determining whether Runtime Type 2" is equivalent to Runtime Type 2' (loaded based on Runtime Type Reference 2 during the initial verification).

If the actual assignable relationship between Runtime Type 2" and Runtime Type 3" does not adhere to the stored assignable relationship, then the stored assignable relationship is not satisfied (Operation 910). The current runtime type is not verified based on the verification metadata.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
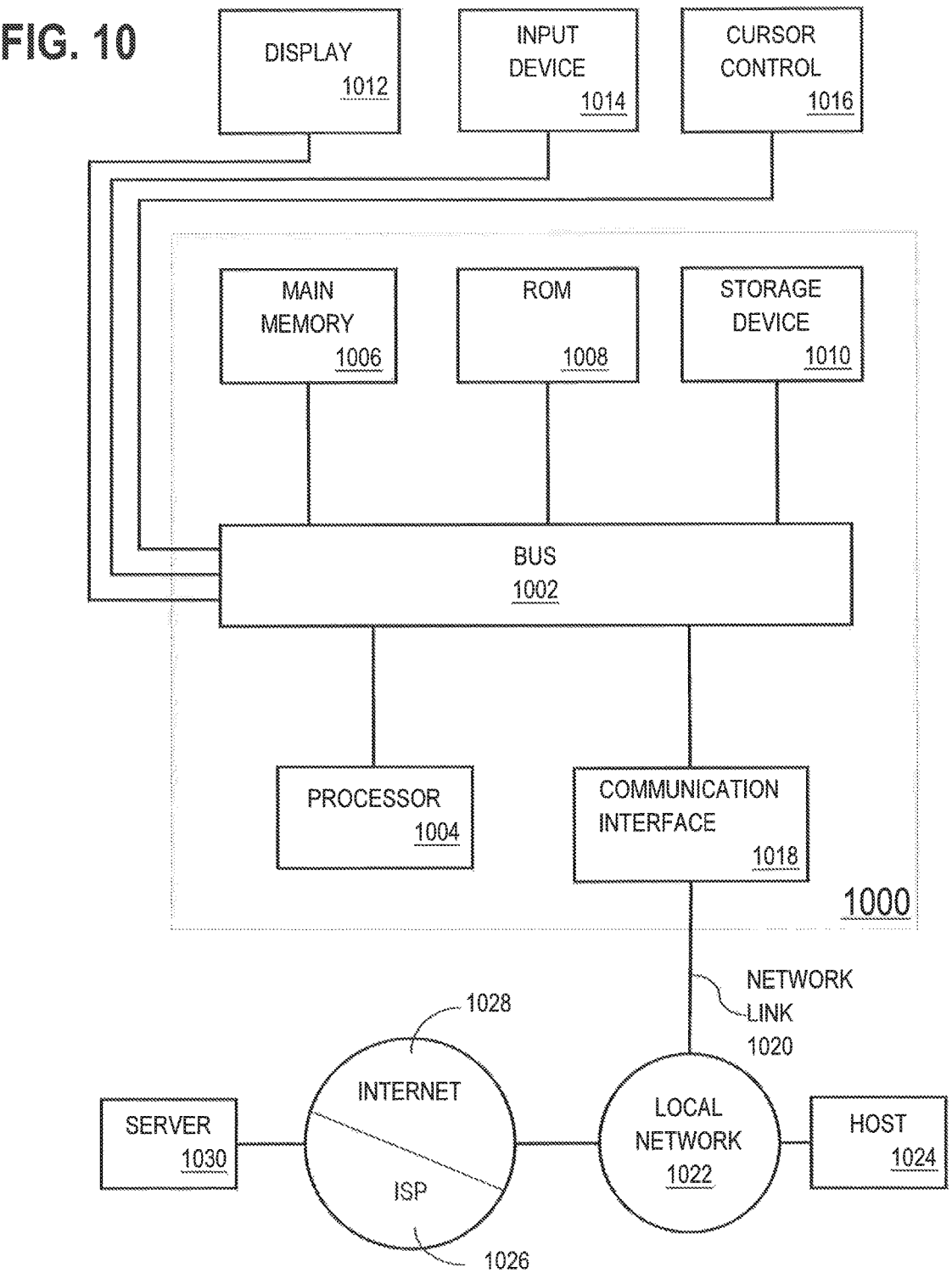
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving a request to verify a first runtime type, loaded based on a first runtime type reference, wherein the first runtime type includes a statement associated with a second runtime type reference and a third runtime type reference;
   responsive to receiving the request to verify the first runtime type:
      identifying verification metadata associated with the first runtime type reference for verifying the first runtime type;
      determining that the verification metadata comprises a stored assignable relationship between the second runtime type reference and the third runtime type reference;
      determining whether an actual assignable relationship between a second runtime type, loaded based on the second runtime type reference, and a third runtime type, loaded based on the third runtime type reference, adheres to the stored assignable relationship between the second runtime type reference and the third runtime type reference; and
      responsive at least to determining that the actual assignable relationship adheres to the stored assignable relationship, determining that the first runtime type is verified based on the verification metadata.

2. The medium of claim 1, wherein:
   the second runtime type reference comprises a particular type and a particular class loader type reference for loading the particular type; and
   the third runtime type reference comprises a different type and a different class loader type reference for loading the different type.

3. The medium of claim 1, wherein the second runtime type is loaded based on the second runtime type reference.

4. The medium of claim 1, wherein the first runtime type is determined to be verified based on the verification metadata regardless of whether the second runtime type is equivalent to a runtime type loaded, based on the second runtime type reference, during a prior time period in which the verification metadata was generated.

5. The medium of claim 1, wherein the first runtime type is determined to be verified based on the verification metadata without determining that the second runtime type is equivalent to a runtime type loaded, based on the second runtime type reference, during a prior time period in which the verification metadata was generated.

6. The medium of claim 1, wherein determining that the first runtime type is verified based on the verification metadata is further responsive to:
   determining that the first runtime type is equivalent to a runtime type loaded, based on the first runtime type reference, during a prior time period in which the verification metadata was generated.

7. The medium of claim 6, wherein determining that the first runtime type is equivalent to the runtime type loaded, based on the first runtime type reference, during the prior time period in which the verification metadata was generated comprises:
   determining a first checksum of a first class file corresponding to the runtime type loaded, based on the first runtime type reference, during the prior time period in which the verification metadata was generated;
   determining a second checksum of a second class file corresponding to the first runtime type; and
   determining that the first checksum and the second checksum are same.

8. The medium of claim 1, wherein determining that the first runtime type is verified based on the verification metadata is further responsive to:
   determining that a fourth runtime type, loaded based on a fourth runtime type reference, is a super-type of the first runtime type; and
   determining that the fourth runtime type is equivalent to a runtime type loaded, based on the fourth runtime type reference, during a prior time period in which the verification metadata was generated.

9. The medium of claim 1, wherein determining that the first runtime type is verified based on the verification metadata is further responsive to:
   determining that a fourth runtime type, loaded based on a fourth runtime type reference, is a required pre-loaded type of the first runtime type; and
   determining that the fourth runtime type is equivalent to a runtime type loaded, based on the fourth runtime type reference, during a prior time period in which the verification metadata was generated.

10. The medium of claim 1, wherein the operations further comprise:
    responsive at least to determining that the actual assignable relationship does not adhere to the stored assignable relationship, failing to verify the first runtime type based on the verification metadata.

11. The medium of claim 1, wherein the stored assignable relationship between the second runtime type reference and the third runtime type reference was determined during a prior successful verification of a runtime type loaded based on the first runtime type reference.

12. The medium of claim 11, wherein:
    the request to verify the first runtime type is received by a first class loader in a first class loader context; and
    the prior successful verification was performed by a second class loader in a second class loader context different than the first class loader context.

13. The medium of claim 11, wherein:
    the request to verify the first runtime type is received in a first runtime environment; and
    the prior successful verification was performed in a second runtime environment different than the first runtime environment.

14. The medium of claim 1, wherein the operations further comprise:
    prior to receiving the request to verify the first runtime type, receiving a prior request to verify a runtime type loaded based on the first runtime type reference;
    responsive to receiving the prior request to verify the runtime type loaded based on the first runtime type reference:
      determining that there is an assignable relationship between (a) a runtime type loaded based on the second runtime type reference and (b) a runtime type loaded based on the third runtime type reference; and
      storing the stored assignable relationship between the second runtime type reference and the third runtime type reference.

15. The medium of claim 1, wherein determining that the actual assignable relationship adheres to the stored assignable relationship comprises: determining that the second runtime type is a super-type of the third runtime type.

16. The medium of claim 1, wherein determining that the first runtime type is verified based on the verification metadata comprises: validating a previously-performed verification for a runtime type loaded based on the first runtime type reference.

17. A method, comprising:
    receiving a request to verify a first runtime type, loaded based on a first runtime type reference, wherein the first runtime type includes a statement associated with a second runtime type reference and a third runtime type reference;
    responsive to receiving the request to verify the first runtime type:
      identifying verification metadata associated with the first runtime type reference for verifying the first runtime type;
      determining that the verification metadata comprises a stored assignable relationship between the second runtime type reference and the third runtime type reference;
      determining whether an actual assignable relationship between a second runtime type, loaded based on the second runtime type reference, and a third runtime type, loaded based on the third runtime type reference, adheres to the stored assignable relationship between the second runtime type reference and the third runtime type reference; and
      responsive at least to determining that the actual assignable relationship adheres to the stored assignable relationship, determining that the first runtime type is verified based on the verification metadata;
    wherein the method is performed by at least one hardware device including a processor.

18. A system, comprising:
    at least one hardware device including a processor; and
    the system configured to perform operations comprising:
      receiving a request to verify a first runtime type, loaded based on a first runtime type reference, wherein the first runtime type includes a statement associated with a second runtime type reference and a third runtime type reference;

responsive to receiving the request to verify the first runtime type:
- identifying verification metadata associated with the first runtime type reference for verifying the first runtime type;
- determining that the verification metadata comprises a stored assignable relationship between the second runtime type reference and the third runtime type reference;
- determining whether an actual assignable relationship between a second runtime type, loaded based on the second runtime type reference, and a third runtime type, loaded based on the third runtime type reference, adheres to the stored assignable relationship between the second runtime type reference and the third runtime type reference; and
- responsive at least to determining that the actual assignable relationship adheres to the stored assignable relationship, determining that the first runtime type is verified based on the verification metadata.

19. The system of claim 18, wherein:
the second runtime type reference comprises a particular type and a particular class loader type reference for loading the particular type; and
the third runtime type reference comprises a different type and a different class loader type reference for loading the different type.

20. The system of claim 18, wherein the second runtime type is loaded based on the second runtime type reference.

* * * * *

UNITED STATES PATENT AND TRADEMARK OFFICE
CERTIFICATE OF CORRECTION

PATENT NO. : 10,191,753 B2
APPLICATION NO. : 15/156975
DATED : January 29, 2019
INVENTOR(S) : Kinnear et al.

Page 1 of 1

It is certified that error appears in the above-identified patent and that said Letters Patent is hereby corrected as shown below:

In the Specification

In Column 7, Lines 56-57, delete ""[[L CassName"" and insert -- "[[L ClassName" --, therefor.

In Column 8, Line 1, delete "{ParamelerDescriptor}" and insert -- {ParameterDescriptor} --, therefor.

In Column 20, Line 7, delete "Type 1)" and insert -- Type 1') --, therefor.

In Column 22, Line 21, delete "1'(loaded" and insert -- 1' (loaded --, therefor.

Signed and Sealed this
Fourth Day of February, 2020

Andrei Iancu
*Director of the United States Patent and Trademark Office*